(12) United States Patent
Ahn et al.

(10) Patent No.: US 11,636,959 B2
(45) Date of Patent: Apr. 25, 2023

(54) CABLE COMPRISING CROSSLINKED LAYER OBTAINED FROM POLYMER COMPOSITION

(71) Applicant: NEXANS, Courbevoie (FR)

(72) Inventors: Dae-Up Ahn, Chungcheongbuk-do (KR); Jun-Huei Bae, Hwaseong-si (KR); Jong-Chan Lim, Chungcheongbuk-do (KR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/408,622

(22) Filed: May 10, 2019

(65) Prior Publication Data

US 2019/0371489 A1    Dec. 5, 2019

(30) Foreign Application Priority Data

May 10, 2018 (KR) ........................ 10-2018-0053406

(51) Int. Cl.
| | | |
|---|---|---|
| *H01B 3/00* | (2006.01) | |
| *H01B 7/00* | (2006.01) | |
| *C08K 5/00* | (2006.01) | |
| *C08K 5/092* | (2006.01) | |
| *C08K 5/17* | (2006.01) | |
| *C08L 31/06* | (2006.01) | |
| *C08L 63/00* | (2006.01) | |

(52) U.S. Cl.
CPC ......... *H01B 7/0054* (2013.01); *C08K 5/0025* (2013.01); *C08K 5/092* (2013.01); *C08K 5/17* (2013.01); *C08L 31/06* (2013.01); *C08L 63/00* (2013.01)

(58) Field of Classification Search
CPC ....................................................... H01B 3/00
See application file for complete search history.

(56) References Cited

U.S. PATENT DOCUMENTS

| | | | |
|---|---|---|---|
| 4,657,781 A | 4/1987 | Nicco et al. | |
| 4,680,229 A * | 7/1987 | Betts | H01B 3/441 174/110 PM |
| 5,169,716 A * | 12/1992 | Croft | H01B 3/44 174/107 |
| 2004/0132907 A1 * | 7/2004 | Nakamura | C08L 53/025 525/88 |
| 2011/0186330 A1 * | 8/2011 | Mazel | H01B 7/292 174/121 A |
| 2011/0220392 A1 | 9/2011 | Hjertberg et al. | |
| 2016/0062242 A1 * | 3/2016 | Hamaguchi | G03F 7/38 174/251 |
| 2018/0100059 A1 | 4/2018 | Ahn et al. | |
| 2018/0118909 A1 * | 5/2018 | Jeromenok | C08J 9/08 |
| 2020/0279671 A1 * | 9/2020 | Doufas | C08L 23/0815 |
| 2022/0127407 A1 * | 4/2022 | Matner | C08G 18/161 |

FOREIGN PATENT DOCUMENTS

| | | | |
|---|---|---|---|
| EP | 3015483 | * | 5/2016 |
| WO | WO 2018/039331 | * | 3/2018 |

OTHER PUBLICATIONS

EU Search Report dated Oct. 2, 2019.

* cited by examiner

*Primary Examiner* — Chau N Nguyen
(74) *Attorney, Agent, or Firm* — Sofer & Haroun, LLP

(57) ABSTRACT

A cable is provided having at least one elongated conductor surrounded by at least one cross-linked layer, said layer being obtained from a polymer composition comprising a polymer, a crosslinking agent, and an amine as co-crosslinking agent, wherein said amine has a nucleophilic value (N) of 14 or more.

13 Claims, No Drawings

CABLE COMPRISING CROSSLINKED LAYER OBTAINED FROM POLYMER COMPOSITION

RELATED APPLICATION

This application claims the benefit of priority from Korean Patent Application No. 10-2018-0053406, filed on May 10, 2018, the entirety of which is incorporated by reference.

FIELD OF THE INVENTION

The present invention relates to a cable including at least one elongated conductor surrounded by at least one cross-linked layer, said layer being obtained from a polymer composition.

BACKGROUND

A peroxide based crosslinking agents are widely used commercially since they crosslink the polymer quickly and effectively. However, such peroxide based crosslinking agents generate a significant amount of by-products having low molecular weight during crosslinking reaction, and such by-products are vaporized at a crosslinking temperature of high temperature to damage the appearance of the product, and remain in the product after crosslinking, greatly decreasing the aging stability and electrical stability of the product. Therefore, there is disadvantage in that in order to crosslink a polymer composition comprising the peroxide based crosslinking agent, using a pressurizing device capable of preventing appearance damage due to by-products at the time of crosslinking, or adding degassing process that minimizes the decrease in product stability due to by-products after crosslinking are needed.

In order to solve the disadvantage of the peroxide based crosslinking agent, a method of crosslinking a reactive polymer comprising carboxyl group or an epoxy group by using compounds such as polyamines, diamine carbamates, ammonium salts of organic carboxylic acid, imidazole compounds, and the like, as a crosslinking agent, has been proposed. However, the crosslinking speed of these crosslinking agents is too fast or too slow compared with the peroxide based crosslinking agent, and thus commercial use thereof has been limited. If the crosslinking speed is too high, scorch can be generated during the storage, mixing or processing of the composition before molding the product. Also, if the crosslinking speed is too slow, a long hours of post-curing process at a high temperature is additionally required.

Therefore, in order to commercially use the cross-linked product of the reactive polymer, it is essential to control the crosslinking speed to the extent equivalent to the peroxide based crosslinking agent.

For this purpose, various crosslinking agents have been proposed. Particularly, a composition comprising a reactive polymer containing an epoxy group, together with a polycarboxylic acid compound having two or more carboxyl groups and a quaternary ammonium (or phosphonium) salt, has been proposed (U.S. Pat. Nos. 4,650,834 and 5,334,666). However, in this case, since quaternary ammonium (or phosphonium) salt comprising halogen atom is comprised as a crosslinking agent, it is not suitable for producing a crosslinked product of non-halogen based polymer.

Thus, there is still a need for a technique that can be commercially available and can provide a crosslinking speed as fast as the peroxide based crosslinking agent.

OBJECTS OF THE INVENTION

It is an object of the present invention to provide a cable providing an optimized aging stability, while guaranteeing a fast crosslinking, said cable comprising at least one crosslinked layer obtained from the polymer composition.

In order to achieve the object, the present invention provides a cable including at least one elongated conductor surrounded by at least one cross-linked layer, said layer being obtained from a polymer composition comprising a polymer, a crosslinking agent, and an amine as co-crosslinking agent, wherein said amine has a nucleophilic value (N) of 14 or more, and more preferably of 15 or more, and even more preferably 16 or more In one preferable embodiment according to the present invention, the crosslinking agent comprised in the polymer composition can be a polyepoxide or a polycarboxylic acid.

In another preferable embodiment according to the present invention, the polymer comprised in the polymer composition can be a polymer containing one or several carboxyl group(s), or a polymer containing one or several epoxy group(s).

More particularly, when a polymer containing one or several carboxyl group(s) is used as polymer in the present invention, it is preferable that a polyepoxide is used as crosslinking agent. When a polymer containing one or several epoxy group(s) is used as polymer in the present invention, it is preferable that a polycarboxylic acid is used as crosslinking agent.

In addition, preferably, the amine is a tertiary amine. More preferably, said amine is at least one selected from:
- monocyclic or bicyclic amines selected from 1,4-diazabicyclo[2.2.2]octane(DABCO), quinuclidine, piperidine, N-methylpiperidine, pyrrolidine, N-methylpyrrolidine, morpholine;
- guanidines selected from 1,5,7-triazabicyclo[4.4.0]dec-5-ene(TBD), 1,2,3,5,6,7-hexahydroimidazo[1,2-a]pyrimidine(TBN), and Di-o-tolylguanidine(DOTG);
- monocyclic or bicyclic amidine bases selected from 1,8-diazabicyclo[5.4.0]undec-7-ene(DBU), 1,5-diazabicyclo[4.3.0]non-5-ene(DBN), 2-Methyl-1,4,5,6-tetrahydropyrimidine; or
- aminopyridines selected from 4-(dimethylamino)pyridine.

Preferably, the amine according to the present invention is comprised in the composition in an amount of from 0.05 parts by weight or more to 3 parts by weight or less, with respect to 100 parts by weight of the polymer.

Preferably, the polymer according to the present invention can be selected from the group consisting of polyethylenes, polybutadienes, ethylene-propylene copolymers, ethylene-α-olefin copolymers, acrylate copolymers, ethylene-vinyl acetate copolymers, ethylene-acrylate copolymers, ethylene-vinyl acetate-acrylate copolymers, acrylate-acrylonitrile copolymers, butadiene-acrylonitrile copolymers, butadiene-styrene copolymers, butadiene-acrylonitrile-acrylate copolymers, styrene-[ethylene-(ethylene-propylene)]-styrene block copolymers, and styrene-(ethylene-butylene)-styrene block copolymers.

Preferably, the polyepoxide according to the present invention is selected from:
a) aliphatic compounds selected from the group consisting of diethylene glycol diglycidyl ether, diglycidyl ether, ethylene glycol diglycidyl ether, glycerol diglycidyl ether, neopentyl glycol diglycidyl ether, and propylene glycol diglycidyl ether;

b) cyclic compounds selected from the group consisting of diglycidyl 1,2-cyclohexanedicarboxylate, and triglycidyl isocyanurates;

c) aromatic compounds selected from the group consisting of bisphenol A diglycidyl ether, N,N-diglycidyl-4-glycidyloxyaniline, and 4,4'-methylenebis (N,N-diglycidylaniline);

d) polymers containing two or more epoxy groups in main chain, branch or terminal of the polymer and having a molecular weight of 10,000 g/mol or less; or e) a mixture of two or more selected from the above a) to d).

Preferably, the polycarboxylic acid of the present invention is selected from:

a') aliphatic compounds selected from the group consisting of adipic acid, azelaic acid, citric acid, dodecanoic acid, itaconic acid, malic acid, maleic acid, sebacic acid, succinic acid, and succinic anhydride;

b') cyclic compounds selected from the group consisting of 1,4-cyclohexanedicarboxylic acid, and cis-4-cyclohexene-1,2-dicarboxylic acid;

c') aromatic compounds selected from the group consisting of 1,3,5-benzenetricarboxylic acid, isophthalic acid, phthalic acid, terephthalic acid, trimellitic acid, phthalic anhydride, and trimellitic anhydride;

d') polymers containing two or more carboxyl groups or maleic anhydrides in main chain, branch or terminal of the polymer and having molecular weight of 10,000 g/mol or less; or e') a mixture of two or more selected from said a') to d').

In one embodiment according to the present invention, said polymer composition further comprises an organometallic compound, such as for example dibutyltin dilaurate, or a bismuth-based carboxylate.

In another embodiment, the cable according to the present invention is an electric power cable.

SUMMARY OF ADVANTAGEOUS EFFECTS

The polymer composition according to the present invention can provide a high crosslinking rate and crosslinking degree, so that it can be cross-linked by commonly used crosslinking process as in the case of containing a peroxide crosslinking agent without additional post-crosslinking process. In addition, since peroxide based crosslinking agent is not used, no by-products are generated from the crosslinking agent during crosslinking, and thus the composition can be cross-linked without any additional crosslinking equipment for pressurization, and aging stability and electrical stability due to by-product are not reduced without application of a degassing process after crosslinking. Therefore, a cross-linked layer having improved aging stability and electrical stability can be obtained.

In addition, the polymer composition according to the present invention contains amine and/or organometallic compound as non-halogen based co-crosslinking agent, it can be particularly useful for the production of non-halogen based cross-linked layer.

Accordingly, the at least one cross-linked layer obtained from the polymer composition according to the present invention can be used, for example, as an insulating layer, a semi-conductive layer and a coating (or sheath) layer in a cable, especially a non-toxic non-halogen based cable, to provide an improved aging stability, electrical stability, and improved electrical properties.

The cable including at least one cross-linked layer obtained from the polymer composition according to the present invention can be used not only for general electric power cables, but also cables in a variety of applications including shipboard, offshore, wind, rolling stock, automotive, mining, and building.

DETAILED DESCRIPTION OF THE INVENTION

Hereinafter, the invention will be described in more detail.

The present invention provides a cable including at least one elongated conductor surrounded by at least one cross-linked layer, said layer being obtained from a polymer composition comprising a polymer, a crosslinking agent, and an amine as co-crosslinking agent, wherein said amine has a nucleophilic value (N) of 14 or more.

Polymer Composition

The polymer composition according to the present invention is a cross-linkable polymer composition, and includes a polymer, a crosslinking agent, and an amine.

(A) Polymer

The polymer composition according to the present invention includes a polymer, preferably a reactive polymer. In one embodiment according to the present invention, the composition according to the present invention comprises a polymer containing one or several carboxyl group(s) as a polymer. In a preferable embodiment, said polymer containing one or several carboxyl group(s) is a polymer comprising one or several carboxylic acid(s), or carboxylic anhydride(s), such as maleic anhydride(s), in main chain or branch of the polymer, and the polymer preferably can be selected from:

polyethylenes, polybutadienes, ethylene-propylene copolymers, ethylene-α-olefin copolymers, acrylate copolymers, ethylene-vinyl acetate copolymers, ethylene-acrylate copolymers, ethylene-vinyl acetate-acrylate copolymers, acrylate-acrylonitrile copolymers, butadiene-acrylonitrile copolymers, butadiene-styrene copolymers, butadiene-acrylonitrile-acrylate copolymers, styrene-[ethylene-(ethylene-propylene)]-styrene block copolymers, and styrene-(ethylene-butylene)-styrene block copolymers. In addition, said polymer can preferably contain 0.1% by weight or more, preferably 0.5% by weight or more, more preferably 1% by weight or more, based on the total weight of the polymer, of repeating units comprising said carboxyl groups. In addition, said polymer can also preferably contain 30% by weight or less, preferably 20% by weight or less, more preferably 15% by weight or less, based on total weight of the polymer, of repeating units comprising said carboxyl groups.

In addition, preferably, the polymer according to the present invention has a molecular weight of greater than 5,000 g/mol. And, the polymer of the present invention preferably has a molecular weight of 1,000,000 g/mol or less.

In another embodiment, the composition of the present invention includes a polymer containing one or several epoxy group(s) as a polymer. In a preferably embodiment, said polymer containing one or several epoxy group(s) is a polymer containing one or more epoxy group(s) in a main chain or branch of the polymer, and the polymer preferably is selected from:

polyethylenes, polybutadienes, ethylene-propylene copolymers, ethylene-α-olefin copolymers, acrylate copolymers, ethylene-vinyl acetate copolymers, ethylene-acrylate copolymers, ethylene-vinyl acetate-acrylate copolymers, acrylate-acrylonitrile copolymers, butadiene-acrylonitrile copolymers, butadiene-styrene copolymers, and butadiene-acrylonitrile-acrylate copolymers.

In addition, said polymer preferably contains 0.1% by weight or more, preferably 0.5% by weight or more, more preferably 1% by weight or more, based on the total weight of the polymer, of repeating units comprising said epoxy groups. In addition, said polymer can also preferably contain 30% by weight or less, preferably 20% by weight or less, more preferably 15% by weight or less, most preferably 10% by weight or less, based on total weight of the polymer, of repeating units comprising said epoxy groups. In addition, preferably, the polymer according to the present invention has a molecular weight of greater than 5,000 g/mol. And, the polymer of the present invention preferably has a molecular weight of 1,000,000 g/mol or less.

In one preferable embodiment, the composition according to the present invention comprises polymer selected from:
- a reactive polymer in which carboxyl groups, are contained in butadiene-acrylonitrile copolymer, which is used as a material for a wire coating because of its excellence in oil resistance, heat resistance, abrasion resistance, and inorganic filler trapping properties (C-NBR);
- a reactive polymer in which carboxyl groups, are contained in ethylene-acrylate copolymer, which is used as a material for a wire coating because of its excellence in heat resistance, oil resistance, cold resistance, and inorganic filler trapping properties (C-AEM);
- a reactive polymer in which carboxyl groups are contained in acrylate copolymer, which is used as a material for wire coating because of its excellence in heat resistance, oil resistance, cold resistance, weather resistance, and inorganic filler trapping properties (C-ACM);
- a reactive polymer in which epoxy groups are contained in ethylene-vinyl acetate-acrylate copolymer, which is used as a material for wire coating because of its excellence in heat resistance, oil resistance, cold resistance, weather resistance, and inorganic filler trapping properties (E-AEVA); or
- an ethylene-GMA copolymer(E-GMA) in which glycidyl methyl methacrylate(GMA) is copolymerized into polyethylene, which is used widely as an insulation material for wire because of its excellent insulating properties.

(B) Crosslinking Agent

The composition according to the present invention comprises a crosslinking agent which is not peroxide based crosslinking agent, i.e. non-peroxide based crosslinking agent as a crosslinking agent.

In one preferable embodiment, the composition of the present invention comprises polyepoxide as a crosslinking agent. The polyepoxide refers to a compound having two or more epoxy groups in one molecule, or a polymer having two or more epoxy groups in main chain, branch, or terminal of the polymer, and having a molecular weight preferably 10,000 g/mol or less, more preferably 5,000 g/mol or less. Preferably, the polyepoxide is at least one selected from:
- aliphatic compounds such as diethylene glycol diglycidyl ether, diglycidyl ether, ethylene glycol diglycidyl ether, glycerol diglycidyl ether, neopentyl glycol diglycidyl ether, propylene glycol diglycidyl ether and the like;
- cyclic compounds such as diglycidyl 1,2-cyclohexanedicarboxylate, triglycidyl isocyanurates, and the like;
- aromatic compounds such as bisphenol A diglycidyl ether, N,N-diglycidyl-4-glycidyloxyaniline, 4,4'-methylenebis(N,N-diglycidylaniline), and the like;
- polymer having two or more epoxy groups in main chain, branch, or terminal of the polymer and having a molecular weight of 10,000 g/mol or less, more preferably 5,000 g/mol or less, and preferably 200 g/mol or more, such as poly(ethylene glycol) diglycidyl ether, poly(propylene glycol) diglycidyl ether, and the like.

More preferably, said polyepoxide is at least one selected from the group consisting of ethylene glycol diglycidyl ether (EGDGE), poly(propylene glycol) diglycidyl ether, and triglycidyl isocyanurates(TGIC).

In another preferably embodiment, the composition according to the present invention comprises polycarboxylic acid as a crosslinking agent. The polycarboxylic acid refers to a compound having two or more carboxyl groups in one molecule, or a polymer having two or more carboxyl groups (i.e. carboxylic acid, or carboxylic anhydride, for example, maleic anhydride) in main chain, branch, or terminal of the polymer, and having a molecular weight preferably 10,000 g/mol or less, more preferably 5,000 g/mol or less. Preferably, the polycarboxylic acid is at least one selected from:
- aliphatic compounds such as adipic acid, azelaic acid, citric acid, dodecanoic acid, itaconic acid, malic acid, maleic acid, sebacic acid, succinic acid, succinic anhydride, and the like;
- cyclic compounds such as 1,4-cyclohexanedicarboxylic acid, cis-4-cyclohexene-1,2-dicarboxylic acid, and the like;
- aromatic compounds such as 1,3,5-benzenetricarboxylic acid, isophthalic acid, phthalic acid, terephthalic acid, trimellitic acid, phthalic anhydride, trimellitic anhydride, and the like,
- polymers containing two or more carboxyl groups or maleic anhydrides in main chain, branch or terminal of the polymer and having molecular weight of 10,000 g/mol or less, more preferably 5,000g/mol, preferably 200g/mol or more, such as carboxyl-terminated polybutadiene, carboxyl-terminated butadiene-acrylonitrile copolymer, maleic anhydride-functionalized polybutadiene, and the like.

More preferably, said polycarboxylic acid is selected from the group consisting of adipic acid (ADA), azelaic acid (AZA), and terephthalic acid (TPA).

In one non-limited embodiment according to the present invention, said crosslinking agent is included in the composition in an amount of 0.1 parts by weight or more, preferably 0.5 parts by weight or more, with respect to 100 parts by weight of the polymer. Another non-limited embodiment according to the present invention, said crosslinking agent is included in the composition in an amount of 10 parts by weight or less, preferably 5 parts by weight or less, with respect to 100 parts by weight of the polymer.

In a first preferable variant according to the present invention, when the polymer according to the present invention is a reactive polymer containing one or several carboxyl group(s), the polymer composition comprising said polymer includes polyepoxide as a crosslinking agent.

In another preferable second variant according to the present invention, when the polymer according to the present invention is a reactive polymer containing one or several epoxy group(s), the polymer composition comprising said polymer includes a polycarboxylic acid as a crosslinking agent.

(C) Co-Crosslinking Agent

The polymer composition according to the present invention includes amine, preferably tertiary amine, more preferably bicyclic amine, having a nucleophilic value (N) of 14 or more.

In the present invention, the nucleophilic value refers to a parameter for measuring nucleophilicity of amines, amino acid, several di- or tri-peptides, and pyrimidines. The method for determining the nucleophilic value is known in the art (B. Maji et al., *Eur. J. Org. Chem.* 2013, 3369), and, for example, it can be determined by the following equation:

$$\log k(20° C.) = s(N+E) \quad (I)$$

k=second-order rate constant), $M^{-1}s^{-1}$
s=nucleophile specific slope parameter
N=nucleophilicity parameter
E=electrophility parameter The co-crosslinking agent comprising an amine having a nucleophilic value of 14 or more according to the present invention is combined with a crosslinking agent according to the present invention, particularly polyepoxides or polycarboxylic acids, so that it can improve the crosslinking rate and degree of crosslinking of the cross-linkable composition according to the present invention.

In one embodiment, said co-crosslinking agent comprises one or more amine having a nucleophilic value (N) of 14 or more, selected from followings:

1) monocyclic or bicyclic amine such as 1,4-diazabicyclo[2.2.2]octane (N=18.9 in $CH_3CN$), quinuclidine (N=20.5 in $CH_3CN$), piperidine (N=18.1 in $H_2O$), N-methylpiperidine (N=18.7 in $CH_3CN$), pyrrolidine (N=17.2 in $H_2O$, N-methylpyrrolidine (N=20.6 in $CH_3CN$), morpholine (N=15.6 in $H_2O$), N-methylmorpholine (N=16.8 in $CH_3CN$), and the like;

2) quanidines such as 1,5,7-triazabicyclo[4.4.0]dec-5-ene (TBD) (N=16.2 in $CH_2Cl_2$), 1,2,3,5,6,7-hexahydroimidazo[1,2-a]pyrimidine(TBN) (N=16.2 in $CH_2Cl_2$), di-o-tolylguanidine:DOTG(N=14~15 in $CH_2Cl_2$), and the like;

3) monocyclic or bicyclic amidine bases such as 1,8-diazabicyclo[5.4.0]undec-7-ene(DBU) (N=15.3 in $CH_3CN$), 1,5-diazabicyclo[4.3.0]non-5-ene(DBN) (N=16.3 in $CH_3CN$), 2-methyl-1,4,5,6-tetrahydropyrimidine) (N=15.2 in $CH_2Cl_2$), and the like;

4) aminopyridines such as 4-(dimethylamino)pyridine (N=15.8 in $CH_2Cl_2$), and the like.

In one preferable embodiment, the amine having a nucleophilic value of 14 or more is 1,4-diazabicyclo[2.2.2]octane (DABCO), or Di-o-tolylguanidine (DOTG).

The composition according to the present invention can further comprise organometallic compound such as dibutyltin dilaurate and bismuth-based carboxylate to further improve its crosslinking rate.

In one non-limited embodiment according to the present invention, the co-crosslinking agent is comprised in the composition in an amount of 0.05 parts by weight or more, more preferably 0.1 parts by weight or more, with respect to 100 parts by weight of the polymer. In another non-limited embodiment according to the present invention, the co-crosslinking agent is comprised in the polymer composition in an amount of 3 parts by weight or less, preferably 1 parts by weight or less, with respect to 100 parts by weight of the polymer.

(D) Other Additives

The polymer composition according to the present invention may optionally further comprise organic and/or inorganic additives. Preferably, metal based and ceramic based inorganic additives can be included in the polymer composition according to the present invention, for example, for filling, improving physical properties, and improving flame retardancy. Said metal-based and ceramic based inorganic additives preferably include one or more selected from the group consisting of carbon black, $CaCO_3$, talc, clay, graphite, silica, mica, antimony trioxide, lead oxide, aluminum hydroxide, magnesium hydroxide, magnesium oxide, zinc oxide. In another preferable embodiment, said organic additives may be added, for example to prevent oxidation, improve processability, improve physical properties, improve dispersibility, or impart flame retardancy. Preferably, the organic additives may include antioxidant, stabilizer, plasticizer, softeners, extenders, pigment, coupling agent, flame retardants, or the mixture thereof.

In one non-limited embodiment, the content of the additives may be at most 500 parts by weight, preferably at most 300 parts by weight, with respect to 100 parts by weight of the polymer.

Preparation of Cross-Linked Layer from the Polymer Composition According to the Invention In one embodiment, the cross-linked layer included in the cable according to the present invention, can be prepared by the method comprising following steps, with using the above-described polymer composition:

(a) step of mixing the polymer, crosslinking agent, and co-crosslinking agent and optionally other additives, at a mixing temperature not higher than the crosslinking temperature, mechanically, for example by two-roll mill, so as to prepare cross-linkable polymer composite. The mixing temperature of this step can be set based on the glass transition temperature or melting point of the polymer. For example, when the polymer having low crystallinity and glass transition temperature lower than the room temperature, such as C-NBR, C-AEM, C-ACM, E-AEVA, is used, the mixing temperature can be set as between 70° C. and 90° C., preferably at 80° C., and when the thermoplastic polymer having relatively high crystallinity, such as E-GMA, is used, the mixing temperature can be set as being 10° C. higher than the melting point of the polymer(for example, in case of E-GMA, 110° C.);

(b) determining the crosslinking properties (e.g., the minimum and maximum torque value ($S_{min}$ and $S_{max}$), the time taken to reach 90% of the maximum torque ($t_{c90}$), and the like) of the crosslinkable polymer composite, prepared in the step (a). Said step can be carried out through a moving die rheometer experiment, preferably at a temperature of between 170° C. and 180° C., which is a crosslinking temperature of polymer combined with typical peroxide based crosslinking agent.

(c) molding and crosslinking the crosslinkable polymer composite prepared in the step (a) for $t_{c90}$ determined in step (b) at a crosslinking temperature and pressure predetermined, for example using compression mold.

Cable

The cable according to the present invention includes at least one elongated conductor surrounded by one or more cross-linked layers. At this time, the cross-linked layer is obtained from the above-described polymer composition.

In one embodiment, said cable may include at least one said cross-linked layers as an insulating layer, a semi-conductive layer, and/or a sheath (or coating) layer. In particular, the cross-linked layer can be used in a cable, particularly a non-toxic non-halogen based cable, to provide improved aging stability and electrical stability.

The cable according to the present invention can be used as a general electric power cable. In addition, the cable can also be used as a cable for shipboard, offshore, wind, rolling stock, automotive, mining, building, and the like.

EXAMPLE

Hereinafter, the present invention is described in further detail in the following Examples which are not in any way intended to limit the scope of the invention as claimed. In addition, it will appear to a person skilled in the art that various modifications may be made to the disclosed Examples, and that such modifications are intended to be within the scope of the present invention.

Preparation of the Polymer Composition According to the Present Invention and the Cross-Linked Product Thereof and Determination of Crosslinking Properties Representative Example for Preparation Ethylene-acrylate copolymer containing carboxyl group (C-AEM, Denka ER A804, about 2wt % of carboxyl groups are contained), triglycidyl isocyanurates (TGIC, I0428, Tokyo Chemical Industry Co.), 1,4-diazabicyclo[2.2.2]octane (DABCO, D0134, Tokyo Chemical Industry Co.), dibutyltin dilaurate (DBTDL, Dabco T-12, OHSUNG polytec co.), PCD-50 (Rhenogran PCD-50, RheinChemie), and CaCO3 (Hydorcarb 95T, Omya International AG) were mixed with the mixing ratio as shown in Table 1 below, using two roll-mill, at 80° C. for 10 minutes to prepare the polymer composition according to the present invention. The crosslinking properties such as minimum and maximum torque values ($S_{min}$ and $S_{max}$) and time taken to reach 90% of the maximum torque value ($t_{c90}$) were measured through an experiment using moving die rheometer. Then, the polymer composition thus prepared was molded and cross-linked, during above-measured $t_{c90}$ at a predetermined cross-linking temperature (180° C.) at a pressure of about 30 bar using compression mold, so as to prepare a cross-linked product.

TABLE 1

| | abbreviation | Mixing ratio (phr) | Weight ratio (%) |
|---|---|---|---|
| Polymer | C-AEM (Denka ER A804) | 100 | 69.4 |
| crosslinking agent | TGIC | 2 | 1.39 |
| tertiary amine co-crosslinking agent | DABCO | 0.5 | 0.347 |
| Organometallic compound | DBTDL | 0.5 | 0.347 |
| Filler | CaCO3 | 40 | 27.8 |
| antioxidant | PCD-50 | 1 | 0.694 |

In Table 1, phr refers to parts by weight with respect to 100 parts by weight of the sum of polymers.

With the same manner as in the above-mentioned representative example for preparation and by using the components and mixing ratio described in the Table 2 below, the polymer composition according to the present invention (examples) or the polymer composition not according to the present invention (comparative examples) were prepared. And their crosslinking properties were measured, and summarized in the Table 2 below:

TABLE 2

| Example No. | components | Mixing ratio (phr) | $S_{max}$ (dNm) | ΔS (dNm) ($S_{max}$ − $S_{min}$) | $t_{c90}$ (min) |
|---|---|---|---|---|---|
| 1* | C-AEM (A804) | 100 | 2.7 | 2.2 | 40.2 |
| | DADPM | 2 | | | |
| | DABCO | 0.5 | | | |
| | DBTDL | 0.5 | | | |
| | CaCO3 | 40 | | | |
| | PCD-50 | 1 | | | |
| 2* | C-AEM (A804) | 100 | 2.7 | 2.1 | 49.8 |
| | EGDGE | 2 | | | |
| | EMI | 0.5 | | | |
| | DBTDL | 0.5 | | | |
| | CaCO3 | 40 | | | |
| | PCD-50 | 1 | | | |
| 3 | C-AEM (A804) | 100 | 5.1 | 4.4 | 13.9 |
| | TGIC | 2 | | | |
| | DABCO | 0.5 | | | |
| | DBTDL | 0.5 | | | |
| | CaCO3 | 40 | | | |
| | PCD-50 | 1 | | | |
| 4 | C-AEM (A804) | 100 | 5.2 | 4.4 | 20.4 |
| | TGIC | 2 | | | |
| | DOTG | 2 | | | |
| | DBTDL | 0.5 | | | |
| | CaCO3 | 40 | | | |
| | PCD-50 | 1 | | | |
| 5 | C-AEM (A804) | 100 | 4.4 | 3.5 | 19.5 |
| | EGDGE | 2 | | | |
| | DABCO | 0.5 | | | |
| | DBTDL | 0.5 | | | |
| | CaCO3 | 40 | | | |
| | PCD-50 | 1 | | | |
| 6 | C-AEM (A804) | 100 | 7.2 | 5.8 | 26.0 |
| | EGDGE | 2 | | | |
| | DOTG | 1 | | | |
| | DBTDL | 0.5 | | | |
| | CaCO3 | 40 | | | |
| | PCD-50 | 1 | | | |
| 7* | C-AEM (A403) | 100 | 3.2 | 2.8 | 35.0 |
| | DADPM | 2 | | | |
| | DOTG | 1 | | | |
| | DBTDL | 0.5 | | | |
| | CaCO3 | 40 | | | |
| | PCD-50 | 1 | | | |
| 8 | C-AEM (A403) | 100 | 6.1 | 5.1 | 14.5 |
| | TGIC | 2 | | | |
| | DABCO | 0.5 | | | |
| | DBTDL | 0.5 | | | |
| | CaCO3 | 40 | | | |
| | PCD-50 | 1 | | | |
| 9 | C-AEM (A403) | 100 | 4.3 | 3.9 | 23.6 |
| | EGDGE | 2 | | | |
| | DABCO | 0.5 | | | |
| | DBTDL | 0.5 | | | |
| | CaCO3 | 40 | | | |
| | PCD-50 | 1 | | | |
| 10 | C-AEM (A403) | 100 | 3.7 | 3.1 | 32.4 |
| | PPG-DGE640 | 3 | | | |
| | DABCO | 0.5 | | | |
| | DBTDL | 0.5 | | | |
| | CaCO3 | 40 | | | |
| | PCD-50 | 1 | | | |
| 11 | C-AEM (A403) | 100 | 4.3 | 3.5 | 23.4 |
| | PPG-DGE380 | 3 | | | |
| | DABCO | 0.5 | | | |
| | DBTDL | 0.5 | | | |
| | CaCO3 | 40 | | | |
| | PCD-50 | 1 | | | |
| 12* | C-NBR (NX775) | 100 | 2.9 | 2.3 | 51.3 |
| | MCHAC | 2 | | | |
| | DABCO | 0.5 | | | |
| | DBTDL | 0.5 | | | |
| | CaCO3 | 40 | | | |
| | PCD-50 | 1 | | | |

TABLE 2-continued

| Example No. | components | Mixing ratio (phr) | $S_{max}$ (dNm) | ΔS (dNm) ($S_{max} - S_{min}$) | $t_{c90}$ (min) |
|---|---|---|---|---|---|
| 13 | C-NBR (NX775) | 100 | 7.4 | 6.3 | 18.3 |
|  | TGIC | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 14 | C-NBR (NX775) | 100 | 6.1 | 5.2 | 31.6 |
|  | EGDGE | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 15 | C-NBR (NX775) | 100 | 4.1 | 3.2 | 38.8 |
|  | PPG-DGE640 | 3 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 16 | C-NBR (NX775) | 100 | 6.2 | 4.9 | 22.7 |
|  | PPG-DGE380 | 3 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 17 | C-NBR (NX775) | 100 | 6.3 | 5.5 | 23.3 |
|  | PPG-DGE380 | 3 |  |  |  |
|  | DABCO | 0.5 |  |  |  |
|  | CaCO₃ | 40 |  |  |  |
|  | PCD-50 | 1 |  |  |  |
| 18 | C-NBR (NX775) | 100 | 7.5 | 6.6 | 17.9 |
|  | PPG-DGE380 | 4 |  |  |  |
|  | DABCO | 0.5 |  |  |  |
|  | CaCO₃ | 40 |  |  |  |
|  | PCD-50 | 1 |  |  |  |
| 19 | C-NBR (NX775) | 100 | 7.6 | 6.6 | 17.9 |
|  | PPG-DGE380 | 4 |  |  |  |
|  | DABCO | 1 |  |  |  |
|  | CaCO₃ | 40 |  |  |  |
|  | PCD-50 | 1 |  |  |  |
| 20 | C-NBR (1072) | 100 | 8.6 | 7.4 | 18.6 |
|  | TGIC | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 21 | C-NBR (1072) | 100 | 7.2 | 6.4 | 32.7 |
|  | EGDGE | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 22* | E-AEVA (5300) | 100 | 2.9 | 2.6 | 49.3 |
|  | APP[(4)] | 2 |  |  |  |
|  | DOTG | 1 |  |  |  |
|  | DBTDL | 0.5 |  |  |  |
|  | CaCO₃ | 40 |  |  |  |
|  | PCD-50 | 1 |  |  |  |
| 23* | E-AEVA (5300) | 100 | 3.2 | 2.8 | 48.5 |
|  | DADPM | 2 |  |  |  |
|  | DOTG | 1 |  |  |  |
|  | DBTDL | 0.5 |  |  |  |
|  | CaCO₃ | 40 |  |  |  |
|  | PCD-50 | 1 |  |  |  |
| 24 | E-AEVA (5300) | 100 | 3.4 | 2.8 | 37.1 |
|  | AzA | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 25 | E-AEVA (5300) | 100 | 3.1 | 2.6 | 34.7 |
|  | TPA | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 26* | E-GMA | 100 | No change in torque value at 180° C. for 1 hour | | |
|  | MCHAC | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 27 | E-GMA | 100 | 3.5 | 3.0 | 28.1 |
|  | AdA | 2 |  |  |  |
|  | DABCO | 0.5 |  |  |  |
|  | CaCO₃ | 40 |  |  |  |
|  | PCD-50 | 1 |  |  |  |
| 28 | E-GMA | 100 | 4.3 | 3.8 | 35.4 |
|  | AdA | 2 |  |  |  |
|  | DABCO | 0.5 |  |  |  |
|  | DBTDL | 0.5 |  |  |  |
|  | CaCO₃ | 40 |  |  |  |
|  | PCD-50 | 1 |  |  |  |
| 29 | E-GMA | 100 | 4.3 | 3.3 | 31.4 |
|  | AdA | 3 |  |  |  |
|  | DABCO | 0.5 |  |  |  |
|  | CaCO₃ | 40 |  |  |  |
|  | PCD-50 | 1 |  |  |  |

*refers to a comparative example not according to the present invention.

The components of polymer, crosslinking agent, and co-crosslinking agent used in the above Examples and Comparative Examples are as follows:

C-NBR: a reactive polymer in which carboxyl groups are contained in butadiene-acrylonitrile copolymer (Nipol NX775 and 1072, respectively containing 0.083 ephr, 0.075 ephr of carboxyl groups, Zeon Co.; "ephr" means "equivalents per hundred parts of rubber", or more particularly for C-NBR: "equivalents of carboxyl groups per hundred parts of reactive polymer"), C-AEM: a reactive polymer in which carboxyl groups are contained in ethylene-acrylate copolymer (Denka ER A403 and A804, about 2 wt. % of carboxyl groups are contained, Denka), C-ACM: a reactive copolymer in which carboxyl groups are contained in acrylate copolymer (Noxtite PA-524 and PA-526, about 1~2 wt. % of carboxyl groups are contained, Unimatec Co. Ltd.)

E-AEVA: a reactive polymer in which epoxy groups are contained in ethylene-vinyl acetate-acrylate copolymer (Denka ER 5300 and 8401, about 1.5 wt. % of epoxy groups are contained, Denka)

E-GMA: an etylene-GMA copolymer in which glycidyl methyl methacrylate (GMA) is copolymerized into polyethylene (LOTADER AX8840, Arkema, 8% GMA is contained)

polyepoxide crosslinking agent: ethylene glycol diglycidyl ether (EGDGE, E0342, Tokyo Chemical Industry Co.), poly(propylene glycol) diglycidyl ether (PPG-DGE380 and PPG-DEG640, respectively 406732 and 406740, Sigma-Adrich), triglycidyl isocyanurates (TGIC, I0428, Tokyo Chemical Industry Co.)

polycarboxylic acid crosslinking agent: adipic acid (ADA, A0161, Tokyo Chemical Industry Co.), azelaic acid (AZA, A0561, Tokyo Chemical Industry Co.), terephthalic acid (TPA, T0166, Tokyo Chemical Industry Co.)

polyamine based crosslinking agent for comparative example: DADPAM (4,4'-diaminodiphenylmethane, M0220, Tokyo Chemical Industry Co.), MCHAC (4,4'-Methylenebis(cyclohexylamine) carbamate, Cheminox AC-6, Unimatec Co. Ltd.), APP (2,2-bis[4-(4-aminophenoxy)phenyl]propane, B1551, Tokyo Chemical Industry Co.)

amine based co-crosslinking agent having 14 or more of nucleophilic value (N): 1,4-diazabicyclo[2.2.2]octane (DABCO, D0134, Tokyo Chemical Industry Co.) (N=18.9 in $CH_3CN$) di-o-tolylguanidine (DOTG, Rhenogran DOTG-70, Rhein Chemie) (N=14~15 in $CH_2Cl_2$)

amine based co-crosslinking agent having less than 14 of nucleophilic value (N) for comparative example: EMI (2-ethyl-4-methylimidazole, E0232, Tokyo Chemical Industry Co.) (N=13.1 in $CH_2Cl_2$)

organometallic compound: dibutyltin dilaurate (DBTDL, DABCO T-12, Ohsung polytech Co.), bismuth-based carboxylate (BiC, DABCO MB-20, Ohsung polytech Co.)

As shown in Table 2 above, a polymer composition comprising a combination of crosslinking agent of polyepoxide or polycarboxylic acid and a co-crosslinking agent having 14 or more of nucleophilic value according to the present invention had significantly higher crosslinking speed ($t_{c90}$) and superior crosslinking degree (ΔS) compared with the polymer composition according to comparative example comprising polyamine based crosslinking agent such as DADPM, MCHAC, APP, which is commercially widely used in the art. (example numbers 2 and 5 in Table 2). Particularly, even when a polyamine-based crosslinking agent was used with the nucleophilic co-crosslinking agent according to the present invention, the crosslinking performance were not significantly improved (Example number 1 of Table 2), and even when a combination of polyepoxide crosslinking agent and co-crosslinking agent having nucleophilic value less than 14 was used, the crosslinking performance was not significantly improved (Example number 2 in Table 2).

In addition, when a co-crosslinking agent having nucleophilic value of 14 or more is comprised, the higher the nucleophilic value, the faster the crosslinking speed, and the lower the nucleophilic value, the more the crosslinking degree tended to increase (Example numbers 3 and 4 or 5 and 6 in Table 2). Furthermore, the crosslinking rate and degree of crosslinking of the polymer composition tended to increase as the number of reactive groups (i.e. epoxy groups or carboxyl groups) of crosslinking agent added increase (Table 2, example number 3, 5 or 8, 9 or 13, 14), as the molecular weight of the crosslinking agent decreases (Table 2, example number 10, 11 or 15, 16), and as the amount of crosslinking agent added increases (Table 2, example number 17, 18). The amount of the co-crosslinking agent having a nucleophilic value of 14 or more, if the amount is more than the necessary amount, did not significantly affect the crosslinking rate and the degree of crosslinking (Table 2, example number 18, 19), and the organometallic compound in the co-crosslinking agents improved the crosslinking rate when added to the crosslinking process of the reactive polymer containing carboxyl group (Table 2, example number 16, 17), and improved the degree of crosslinking when added to the crosslinking process of the reactive polymer containing epoxy group (Table 2, example number 28, 29).

Preparation of Non-halogen Based Flame Retardant Coating Material Obtained from the Polymer Composition According to the Present Invention For preparing a non-halogen based flame retardant coating material according to the present invention, the components shown in the Table below were mixed with the mixing ratio as shown in Table 3 below, using two roll-mill, at 80° C. for 10 minutes so as to prepare a polymer composition. For comparative example, the polymer composition comprising an amine based crosslinking agent, which is currently wisely used commercially, was prepared in the same manner as described above, except that the components and the mixing ratio shown in Table 3 below were used.

Then, cross-linking properties such as $S_{min}$, $S_{max}$ and $t_{c90}$ of the polymer composition thus prepared, were measured through moving die rheometer experiment. The polymer composition was then crosslinked in a mold at 170° C. for a time corresponding to twice the $t_{c90}$ at 180° C. under a pressure of 30 bar to prepare a non-halogen based flame retardant coating material.

For measuring the mechanical properties such as tensile strength, elongation at break, etc. of the coating material prepared, dumbbell specimens according to the standard DIN 53504.S2 were prepared, and tensile strength and elongation et break were measured using a universal tensile testing machine under the experimental conditions defined in standard IEC 60811-501.

For measuring the changed mechanical properties of the prepared coating material after oil immersion or heating, heating and oil tests were performed respectively.

In heating test, after crosslinking, the coating material was stabilized for one day at room temperature, and heat-treated for 168 hours in convention oven at 120r. Then, the changed mechanical properties were measured under the condition defined in the standard IEC 60811-501 using a universal tensile testing machine. In the oil test, after crosslinking, the coating material was stabilized for one day at room temperature, immersed in IRM oil, and then heat-treated in a thermostatic chamber at 100° C. for 7 days according to the standard IEC 60811-404. After that, the changed mechanical properties were measured under the condition defined in the standard IEC 60811-501 using a universal tensile testing machine.

The crosslinking properties of the prepared polymer composition, the mechanical properties and the changed mechanical properties after heating or oil immersion of the prepared non-halogen based flame retardant coating material, were summarized in Table 3 below:

TABLE 3

| component | Comparative example Mixing ratio (phr) | Example Mixing ratio (phr) |
|---|---|---|
| C-ACM (PA-526) | 70 | 70 |
| C-NBR (NX775) | 30 | 30 |
| ATH (Aluminum trihydroxide, Apyral 120E, Nabaltec AG) | 120 | 120 |
| FEF (Fast Extrusion Furnace Black, N550, OCI Co. Ltd.) | 10 | 10 |
| Rhenofit DDA-70 (Lanxess)[1] | 2 | 2 |
| Songnox 1010 (Songwon Industrial Co., Ltd.)[2] | 2 | 2 |
| Rhenogran MMBI-70 (Lanxess)[3] | 1 | 1 |
| MgO (Magchem 40, Magchem Korea Co.) | 2 | 2 |
| Castor oil (Dong Yang Oil Chemical) | 5 | 5 |
| Epoxidized soybean oil (ESO, Sajo Co.) | 15 | 15 |
| Struktol WS 180 (Structol)[4] | 1 | 1 |
| MCHAC | 3 | |
| TGIC | | 3 |
| DABCO | 0.5 | 0.5 |
| $t_{c90}$ (180° C.) (min) | 17.2 | 12.1 |
| TS (MPa) | 8.5 | 9.6 |

TABLE 3-continued

| component | Comparative example Mixing ratio (phr) | Example Mixing ratio (phr) |
|---|---|---|
| EB (%) | 280 | 160 |
| ΔTS after heat test(%) | 30 | −2 |
| ΔEB after heat test(%) | −60 | −4 |
| ΔTS after oil test (%) | 17 | −1 |
| ΔEB after oil test (%) | −40 | −19 |

[1] Rhenofit DDA-70 is a mixture of diphenylamine derivative (70%) and silica filler (30%).
[2] Songnox 1010 is tetrakis[methylene-3-(3,5-di-tert-butyl-4-hydroxyphenyl)propionate] methane.
[3] Rhenogran MMBI-70is a mixture of methyl-2-mercaptobenzimidazole) (70%) and elastomer binder/dispersing agent) (30%).
[4] Struktol WS 180 is a condensation product of fatty acid derivatives and silicones.

As shown in the Table 3, the polymer composition comprising the combination of polyepoxide crosslinking agent and amine having nucleophilic value of 14 or more according to the present invention, showed much higher crosslinking rate compared to the polymer composition comprising a polyamine as a crosslinking agent such as MCHAC, which is currently widely used commercially. In addition, the mechanical properties of the coating material according to the comparative example, not subjected to post-crosslinking process, were largely changed after tests due to the additional crosslinking during the heating and oil tests, whereas, the mechanical properties of coating material according to the present invention were not changed significantly.

Therefore, from the results of said comparative example and example, it is shown that the polymer composition according to the present invention provides improved crosslinking speed and crosslinking degree, so that it can be cross-linked through a crosslinking process generally applied to a polymer composition including a peroxide based crosslinking agent without additional post-crosslinking process.

The invention claimed is:

1. A cable comprising: at least one elongated conductor surrounded by at least one cross-linked layer, said layer being obtained from a polymer composition having a polymer, a crosslinking agent, and an amine as co-crosslinking agent, wherein said amine is a tertiary amine with a nucleophilic value (N) of 16 or more,
   wherein the crosslinking agent in the polymer composition is a polycarboxylic acid;
   wherein the polymer is [a polymer containing one or several carboxyl group(s) or] a polymer containing one or several epoxy group(s);
   wherein the polymer composition comprises the tertiary amine in an amount of from 0.1 parts by weight or more to 1 parts by weight or less, with respect to 100 parts by weight of the polymer; and
   wherein the polymer composition comprises the crosslinking agent in an amount of from 0.5 parts by weight or more to 5 parts by weight or less, with respect to 100 parts by weight of the polymer.

2. The cable according to claim 1, wherein the amine is at least one selected from:
   monocyclic or bicyclic amine selected from 1,4-diazabicyclo[2.2.2]octane (DABCO), quinuclidine, piperidine, N-methylpiperidine, pyrrolidine, and N-methylpyrrolidine;
   guanidines selected from 1,5,7-Triazabicyclo[4.4.0]dec-5-ene (TBD), and 1,2,3,5,6,7-hexahydroimidazo[1,2-a] pyrimidine (TBN); or
   monocyclic or bicyclic amidine bases including 1,5-diazabicyclo[4.3.0]non-5-ene (DBN).

3. The cable according to claim 1, wherein the polycarboxylic acid is selected from:
   a') aliphatic compounds selected from the group consisting of adipic acid, azelaic acid, citric acid, dodecanoic acid, itaconic acid, malic acid, maleic acid, sebacic acid, succinic acid, succinic anhydride;
   b') cyclic compounds selected from the group consisting of 1,4-cyclohexanedicarboxylic acid, cis-4-cyclohexene-1,2-dicarboxylic acid;
   c') aromatic compounds selected from the group consisting of 1,3,5-benzenetricarboxylic acid, isophthalic acid, phthalic acid, terephthalic acid, trimellitic acid, phthalic anhydride, and trimellitic anhydride;
   d') polymers containing two or more carboxyl groups or maleic anhydrides in main chain, branch or terminal of the polymer and having molecular weight of 10,000 g/mol or less; or
   e') a mixture of two or more selected from said a') to d').

4. The cable according to claim 1, wherein the polymer composition further comprises an organometallic compound.

5. The cable according to claim 4, wherein said organometallic compound is selected from the group consisting of dibutyltin dilaurate and bismuth-based carboxylate.

6. The cable according to claim 1, wherein it is an electric power cable.

7. The cable according to claim 1, wherein said selection of said crosslinking agent and said tertiary amine as co-crosslinking agent results in a crosslinking speed that is faster than using a polyamine as crosslinking agent and an amine having a nucleophilic value more than 16 as co-crosslinking agent or faster than using said crosslinking agent and an amine having a nucleophilic value less than 16 as co-crosslinking agent.

8. The cable according to claim 1, wherein said selection of said crosslinking agent and said tertiary amine as co-crosslinking agent results in a crosslinking degree that is higher than using a polyamine as crosslinking agent and an amine having a nucleophilic value more than 16 as co-crosslinking agent or higher than using said crosslinking agent and an amine having a nucleophilic value less than 16 as co-crosslinking agent.

9. The cable according to claim 1, wherein said at least one cross-linked layer is used as any one of an insulating layer, a semi-conductive layer, and a coating or sheath layer in said cable, said at least one cross-linked layer being halogen free.

10. The cable according to claim 1, wherein the polymer has a molecular weight of greater than 5,000 g/mol.

11. The cable according to claim 1, wherein the polymer has a molecular weight of 1,000,000 g/mol or less.

12. The cable according to claim 1, wherein said polymer containing one or several epoxy group(s) contains from 0.1% by weight or more to 30% by weight or less, based on the total weight of the polymer, of repeating units comprising said epoxy groups.

13. The cable according to claim 1, wherein said tertiary amine is bicyclic.

* * * * *